April 21, 1953     O. BARSTOW     2,635,456
FREEZING POINT RECORDER

Filed July 2, 1951     2 SHEETS—SHEET 1

INVENTOR
Ormond Barstow

BY
Griswold & Burdick
ATTORNEYS

Patented Apr. 21, 1953

2,635,456

UNITED STATES PATENT OFFICE 2,635,456

FREEZING POINT RECORDER

Ormond Barstow, Midland, Mich., assignor to The Dow Chemical Company, Midland, Mich., a corporation of Delaware Application July 2, 1951, Serial No. 234,786

3 Claims. (Cl. 73—17)

This invention relates to apparatus for determining and recording automatically the freezing point of liquids.

Among the characteristics of an organic chemical compound which may be used as an index of its purity is its freezing point. In the continuous production of such compounds it would be convenient and desirable to be able to have a record of the freezing point of the product at frequent intervals. In those chemical reactions in which an end point may be recognized by the freezing point of the desired product, it would be most helpful to have a record of the changes in freezing point of the reaction mixture so that, as the desired end point is approached, suitable steps may be taken toward termination of the reaction. In many cases in addition to the types mentioned, a useful apparatus would be a freezing point recorder which is capable of making its determinations automatically, and at frequent intervals. The provision of such an apparatus is the principal object of the present invention.

The apparatus of the invention comprises a sample tube or vessel, means for filling the tube with a liquid whose freezing point is to be determined, means for cooling the contained liquid to its freezing point, a stirrer to keep the sample well mixed; a temperature recorder with its thermoelement immersed in the liquid when the sample tube is full; a crystal detector comprising a pair of metallic elements maintained in relative and intermittently contacting movement beneath the surface of the test liquid; means for applying an electric potential to said metallic elements; and means, responsive to a failure of said elements to make contact for a predetermined time at their point of closest approach, due to the presence of crystals, to replace the tested sample with a fresh sample of the liquid being tested, or means, responsive to the presence of crystals, to cause the recorder to indicate only the initial freezing point of the sample.

Figures 1, 2:
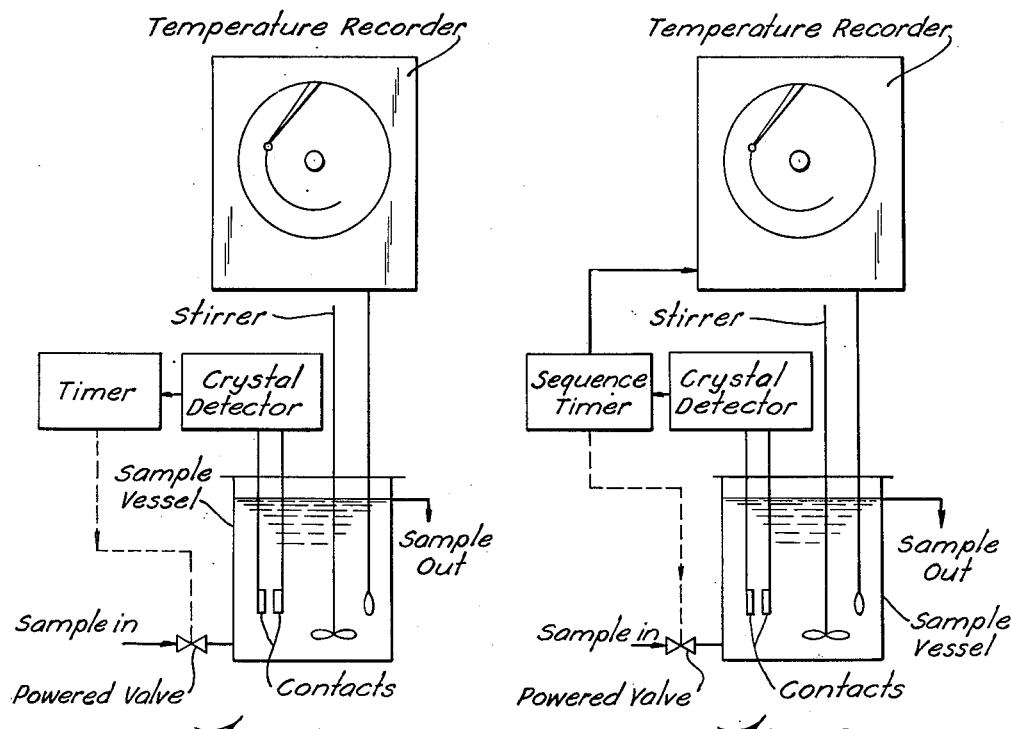
Figure 3:
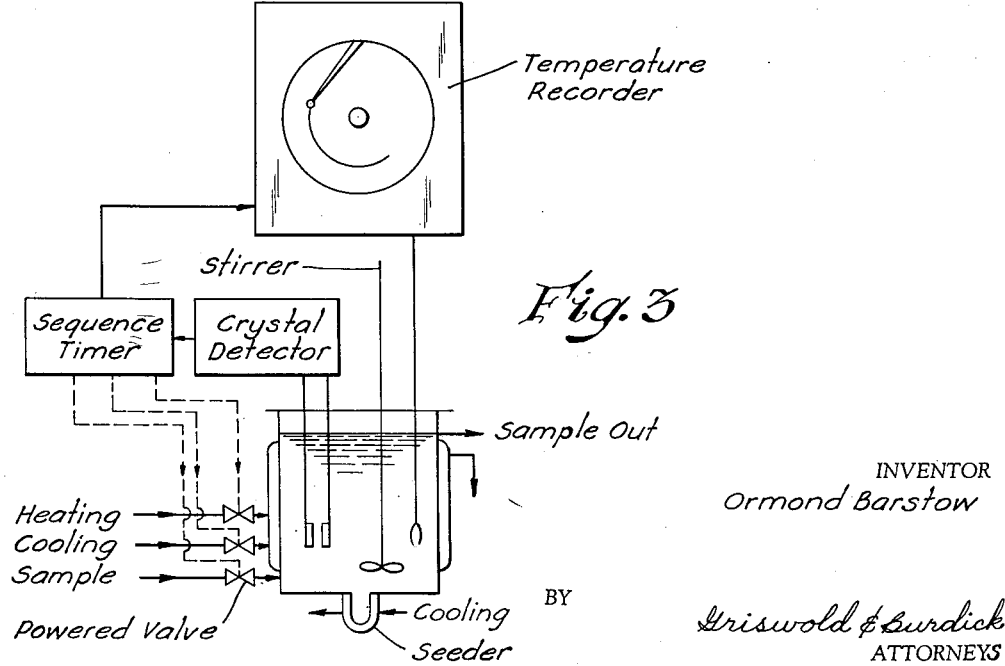
Figure 4:
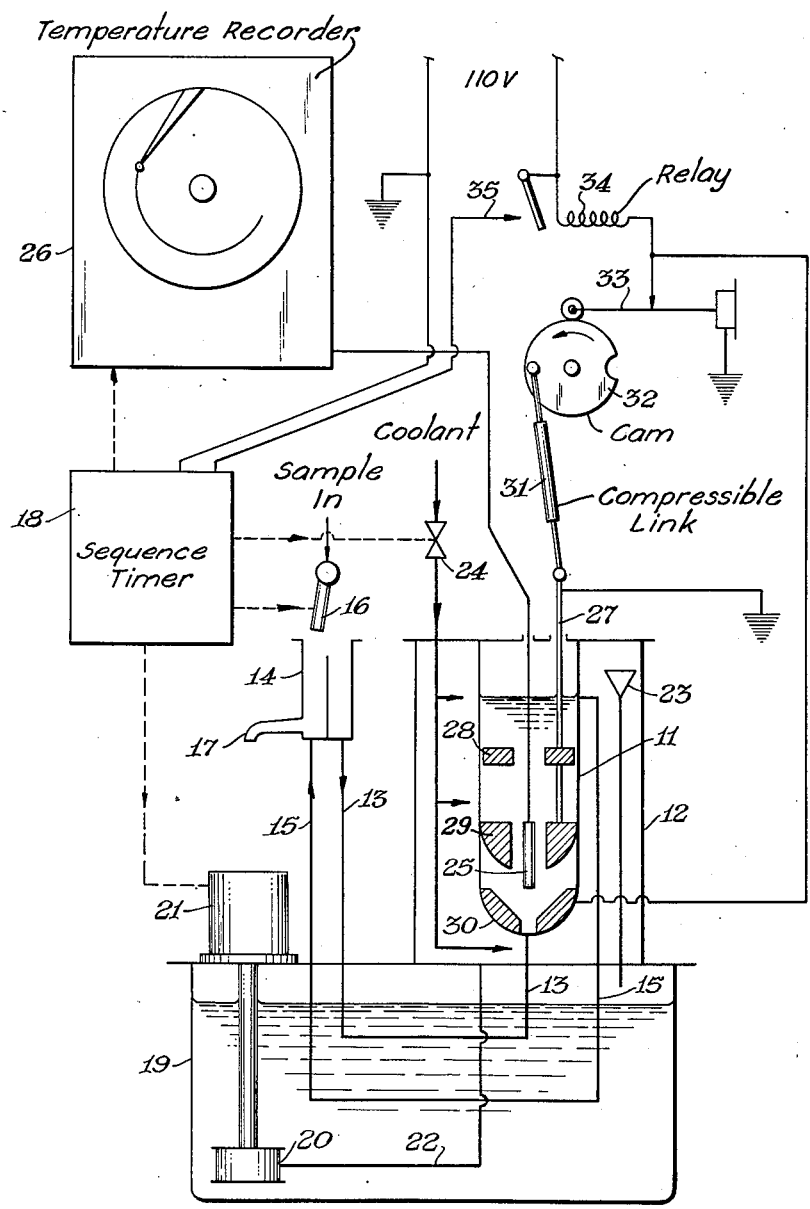

The invention may be understood by reference to the accompanying drawings, wherein Figs. 1, 2 and 3 are schematic representations of various modifications of the apparatus of the invention, to assist in describing the operation of the apparatus; and, Fig. 4 is a more detailed schematic view, partially in elevation and partially in vertical section, of a specific embodiment of the invention.

The principles of operation of the apparatus will be explained with reference to Fig. 1, and to simplify the description, the assumption is made that the liquid being tested has a freezing point above room temperature. A valve in a supply line is opened and a fresh sample of the test liquid flows into the sample vessel, displacing any prior sample therefrom through an overflow line. When the vessel is filled with fresh sample, the flow is stopped, and the sample begins to cool. Stirring is maintained to keep the sample at a uniform temperature, and the temperature is recorded on any of several well known types of temperature recording or recording-controlling instruments. Immersed in the cooling liquid is a crystal detector comprising a pair of metal surfaces which are kept in motion relative to each other. Thus, they may roll or slide into and out of contact, or they may have an intermittent opening and closing action such that the presence of crystals dispersed in the liquid will prevent metal to metal electrical contact between the moving surfaces. Failure of the surfaces to make contact in the normal time interval required for a complete movement of the contact plates is detected by a suitable electrical circuit in the crystal detector, and such failure to complete the circuit in the normal time interval starts a timer which opens the valve to introduce new sample to the vessel and to flush out the partially crystalline material. After a suitable time interval, the valve is closed and the described cycle is repeated. Since supercooling may occur in the cooling cycle, and the minimum temperature could possibly be below the true freezing point of the test liquid, the timer may be set to permit a delay between first detection of crystals in one sample and admission of the next sample, to allow for disappearance of the supercooled condition and attainment of equilibrium conditions at the true freezing point. During each cycle, the pen of the temperature recorder may draw a series of cooling curves on the clock driven chart, which trace the temperature from that of the hot sample to the freezing point, then rise again abruptly to the hot sample temperature.

In some cases, it is considered neither necessary nor desirable for the temperature recorder to draw the complete temperature curves on each sample. It is often preferred that only the initial freezing points be recorded. In such cases, a recorder is used in which the pen is "locked" at all times except those short intervals of which a record is desired. Such a system is illustrated in Fig. 2, wherein it is noted that the timer is coupled to the recorder as well as to the feed valve. Suitable cams on the timer unlock the pen to permit recording of the temperature during one or more recording intervals at particular phases of each cycle, and lock it during the balance of the cycle. When the recorder is a self-balancing Wheatstone bridge connected to a resistance thermometer or is a self-balancing potentiometer connected to a thermocouple, the timer can lock the pen readily by opening the circuit on the balancing motor, closing that circuit only during the desired recording intervals. In such operation, with the recording interval beginning when the presence of crystals is detected, the pen draws a line at the freezing point. If the latter is the same for all samples, a single continuous line is drawn. If the freezing point varies from sample to sample, the curve has small steps, representing the changes in freezing point from one sample to the next. To avoid recording supercooling effects, the recording interval may be set to lag the initial crystal detection by a time factor found by experience to allow for substantial disappearance of the supercooled condition.

Since it may be desirable to make freezing point measurements oftener than would be possible if each sample were allowed to cool in air, or it may be desired to determine a freezing below room temperature, or it may be necessary to thaw out previously frozen samples, it is preferred to have the sample vessel jacketed for circulation thereabout of cooling or heating fluids. Furthermore, in order to accelerate crystallization as the freezing point is reached and to minimize the occurrence of supercooling, it is desirable to be able to "seed" each sample with preformed crystals of the test compound. An apparatus designed for such operation is illustrated in Fig. 3. It is noted that the timer is connected to three valves, one to control the flow of heating fluid to the jacket of the sample vessel, another to control flow of cooling fluid thereto, and another to control flow of the test liquid to the sample vessel. In operation, the heating fluid is admitted to the jacket when the fresh sample is admitted to the sample vessel. This helps to thaw out previously formed crystals, so that the old sample may be flushed out completely. The flow of heating fluid is discontinued by the time the fresh sample has filled the vessel and cooling fluid is admitted to the jacket until the freezing point is reached. The vessel in Fig. 3 is shown as having a jacketed sidearm to serve as a seeder. Cooling fluid may be circulated continuously through the seeder jacket to maintain crystals therein at all times, in contact with the main body of molten material in the sample vessel. The entire testing cycle may be made very brief if the cooling fluid is at a temperature substantially below the freezing point of the sample.

The apparatus illustrated in Fig. 4 has found industrial application in keeping a record of the freezing point of frequent samples taken from the final product stream flowing from a continuous chemical process unit. The sample tube 11 is of glass, and is enclosed in a larger glass vessel 12 which serves both as a sight glass, to permit observation of the sample being tested, and as a jacket for circulation of heating or cooling fluid around the sample tube 11. Sample tube 11 is fed at its lower extremity through tube or pipe 13, from a parting box 14, while overflow from sample tube 11 passes through pipe 15 to the discharge side of parting box 14. The parting box is fed continuously with a stream of the liquid chemical product through swing pipe 16, and discharges all of the chemical not required as a fresh sample, as well as the tested samples returned through pipe 15, from its outlet 17. The position of swing pipe 16 is controlled by a sequence timer 18 (to be discussed more fully later). A supply of heating fluid, at a temperature above the freezing point of the material being tested, is maintained in a reservoir 19, and this fluid may be circulated through jacket 12 by means of an immersion centrifugal pump 20, driven by motor 21, the fluid entering jacket 12 through pipe 22 and overflowing therefrom to reservoir 19 through pipe 23.

When the sample in tube 11 is to be cooled, the pump 20 is stopped and the heating fluid in jacket 12 drains back through pipe 22 and pump 20 into reservoir 19. A cooling fluid, such as air, may be admitted to jacket 12 through valve 24. The temperature of the sample is detected constantly by resistance thermometer or thermocouple 25, and is recorded, either continuously or intermittently, by temperature recorder 26, which may be any of several known types. A stirring rod 27 extends from above tube 11 nearly to the bottom thereof, and carries a ring or rings 28, or other vanes, to stir the contents of tube 11 as rod 27 moves longitudinally. Rod 27 carries at its lower end a metal ring 29 having a hemispherical bottom contour, capable of seating without seizing in the conical upper surface of another metal ring 30, seated in the bottom of tube 11. Rings 29 and 30 constitute the crystal detecting contacts, as will be described. Rod 27 and its supported stirring rings 28 and 29 are mounted for longitudinal reciprocation within tube 11, rod 27 being hinged at its upper end to connecting rod 31 having a compressible link therein, and driven through cam 32 by a motor, not shown. The length of rod 27 and connecting rod 31 is such that contact 29 touches contact 30 shortly before the connecting rod reaches bottom dead center. Through the action of the spring-loaded compressible link, contact 29 then remains against contact 30 until shortly after the connecting rod passes bottom dead center. Cam 32 serves to open switch 33 momentarily during each rotation of the cam and crank mechanism for a short time during the period when ring 29 is proximate to fixed contact ring 30. The coil of relay 34 is energized by current flowing either through switch 33 to ground, or through contacts 29 and 30 to ground. When the presence of crystals in the freezing liquid prevents completion of the circuit between contact rings 29 and 30, there is no path for the relay coil current during the interval that switch 33 is open, and the relay will be de-energized, momentarily closing the relay contact 35 once in each rotation of the cam 32. Each time relay contact 35 is closed, an impulse is sent to the motor of the sequence timer 18, causing the timer mechanism to be advanced stepwise until it reaches the point where it locks itself into continuous operation and goes through a complete timer cycle until it comes to the unlocking point.

The sequence timer 18 may consist of an electric motor driving a series of cams, each of which operates a switch at an appropriate stage of the cycle to perform the various functions described below. One of the cam operated switches serves to lock the timer motor into the power circuit for steady operation, and to stop that motor after a complete revolution of the camshaft.

The operation of the new apparatus will now be described. Let it be assumed that the pen of the temperature recorder 26 is locked, that a fresh sample of the test liquid is in the sample tube 11, that swing pipe 16 is in the left hand position, that cool air is being admitted through valve 14 to headers (illustrated diagrammatically) around tube 11 in jacket 12, that the motor of the sequence timer 18 has stopped, and that the new sample is being cooled and stirred. Since metallic ring 29 is making good electrical contact with fixed ring 30 at the bottom of each stroke of the stirrer rod 27, the momentary opening of the switch 33, which is shunting these contacts, does not interrupt the flow of current to the coil of relay 34, and no current flows to the motor of the sequence timer 18. Hence, the sequence timer may be said to be dead, and the crystal detecting system is in control of the operation of the apparatus. As the sample cools to the freezing point, crystals begin to form in the liquid being tested. When the number of crystals becomes significant, the crystals become interposed between contacts 29 and 30, preventing electrical contact. At this time, when switch 33 opens on each revolution of cam 32, no current flows to the coil of relay 34. When relay 34 is de-energized, the sequence timer motor is supplied with current from the main power source, and the cam shaft of the timer is turned slightly each time ring 29 fails to contact ring 30. After several short movements (sufficient to avoid false starts due to stray crystals or solid impurities), the cam shaft of the timer has been turned far enough so that the first of its switch-operating cams locks the motor into the main circuit, and the timer motor runs continuously. The timer is now in control of the instrument. After a short fixed period of time, sufficient to allow any supercooling effects to disappear in the sample and for the thermometer to come to thermal equilibrium with the sample, another cam in the timer actuates or "unlocks" the pen on the recorder 26 for a few seconds by closing the balance motor circuit in the recorder. The recorder brings itself into balance with the thermoelement 25 and the pen moves, if necessary, and records the temperature of the sample. After a few seconds, the balance motor of the recorder is thrown out of the circuit, and the pen is again "locked" in a fixed position until the next freezing point measurement is to be made. Additional cams in the timer, in sequence, activate other parts of the instrument to complete the cycle. First, the flow of air or other coolant is stopped. Then the pump 20 is started, causing heating fluid to fill jacket 12 around the sample tube 11. The swing pipe 16 is shifted to the right, and fresh sample starts flowing through pipe 13 to the sample tube 11. The combined effects of the heating fluid around the sample tube and of the hot fresh sample entering the tube soon melts all crystals and purges the tube of old sample. The pump 20 is then stopped, and heating fluid in jacket 12 drains back through pipe 22 and pump 20 to the reservoir 19. Swing pipe 16 is shifted to the left, and valve 24 is opened to admit cooling fluid to jacket 12. Finally, the sequence timer 18 stops itself and the crystal detecting circuit is again in control of the instrument. The cycle is repeated indefinitely, and the recorder presents a line or series of lines representing the entire series of freezing point measurements.

It has been found that if some of the cooling air is allowed to impinge on the sample line 13 just below where it enters the bottom of cooling tube 11, the liquid in this tube freezes sooner than the main mass of material in tube 11 and thus provides a source of seeding crystals for the sample, as has been mentioned with respect to Fig. 3.

In one embodiment of the described instrument, the timer requires 2 minutes from the time it locks itself into the circuit until it shuts itself off, and the entire cycle, including the time required to cool and freeze the sample is about 7 minutes. If more frequent determinations are required, the cooling step can be shortened by the use of a colder fluid in the jacket around the sample tube. The timer-controlled portion of the cycle can be altered to fit the requirements of a particular operation by a change in the various cams or by alteration of the gear ratio between the timer motor and the timer camshaft.

When the temperature is indicated on a recording controller, the latter instrument may be used to alter or control various factors affecting the quality of the sample, in response to any deviation from the proper freezing point. For example, when the samples being tested are from a distillate line, a deviation in freezing point may show a need for a greater or a lower reflux ratio in the distillation column, and this adjustment may be made by the controller element.

I claim:

1. An apparatus for determining automatically and recording the freezing point of a liquid, comprising a sample vessel; means for filling the vessel with the liquid to be tested; means for cooling the contained liquid to its freezing point; a continuously operating stirrer in the vessel to keep the sample well mixed; a temperature recorder with its thermoelement immersed in the liquid in the sample vessel; a crystal detector comprising a pair of metallic elements maintained in relative and intermittently contacting movement beneath the surface of the test liquid in the vessel; means for applying an electric potential to said metallic elements; and means, responsive to a continued failure of said elements to make electrical contact for a predetermined time, due to the presence of crystals therebetween, to actuate the first said means and to replace the tested sample with a fresh sample of the liquid being tested.

2. An apparatus for determining automatically and recording the freezing point of a liquid, comprising a sample vessel; means for filling the vessel with the liquid to be tested; means for cooling the contained liquid to its freezing point; a continuously operating stirrer in the vessel to keep the sample well mixed; a temperature recorder with its thermoelement immersed in the liquid in the sample vessel; means for locking the pen of the recorder at a fixed temperature level on the chart of the recorder; a crystal detector comprising a pair of metallic elements maintained in relative and intermittently contacting movement beneath the surface of the test liquid in the vessel; means for applying an electric potential to said metallic elements; and means, responsive to a continued failure of said elements to make electrical contact for a predetermined time, due to the presence of crystals therebetween, to unlock the pen of the recorder to permit the recorder to reach balance with its thermoelement and to record the freezing point of the sample being tested.

3. An apparatus for determining automatically and recording the freezing point of a liquid, comprising a jacketed sample vessel; means for filling the vessel with the liquid to be tested; means for circulating a cooling fluid through the jacket around the sample vessel, to cool the sample to its freezing point; means for circulating a heating fluid through the jacket around the sample vessel, to melt crystals in the sample; a continuously operating stirrer in the vessel to keep the sample well mixed; a temperature recorder with its thermoelement immersed in the liquid in the sample tube; a crystal detector comprising a pair of metallic elements maintained in relative and intermittently contacting movement beneath the surface of the test liquid in the vessel; means for applying an electric potential to said metallic elements; a motor driven sequence timer; means, responsive to continued failure of the metallic elements of the crystal detector to make electrical contact, due to the presence of crystals therebetween, to actuate the timer motor, thereby to actuate in sequence the temperature recorder, the means for circulating heating fluid in the jacket around the tube, the means for filling the tube with fresh sample, and the means for circulating cooling fluid in the jacket around the tube, and to shut off the timer motor until it is actuated again in response to the presence of crystals in the tube.

ORMOND BARSTOW.

References Cited in the file of this patent

UNITED STATES PATENTS

| Number | Name | Date |
|---|---|---|
| 2,297,641 | Webber | Sept. 29, 1942 |
| 2,591,084 | Martin | Apr. 1, 1952 |